March 27, 1956 W. L. THORPE 2,739,832
LINEMAN'S COMBINATION TOOL
Filed Feb. 20, 1953 3 Sheets-Sheet 1
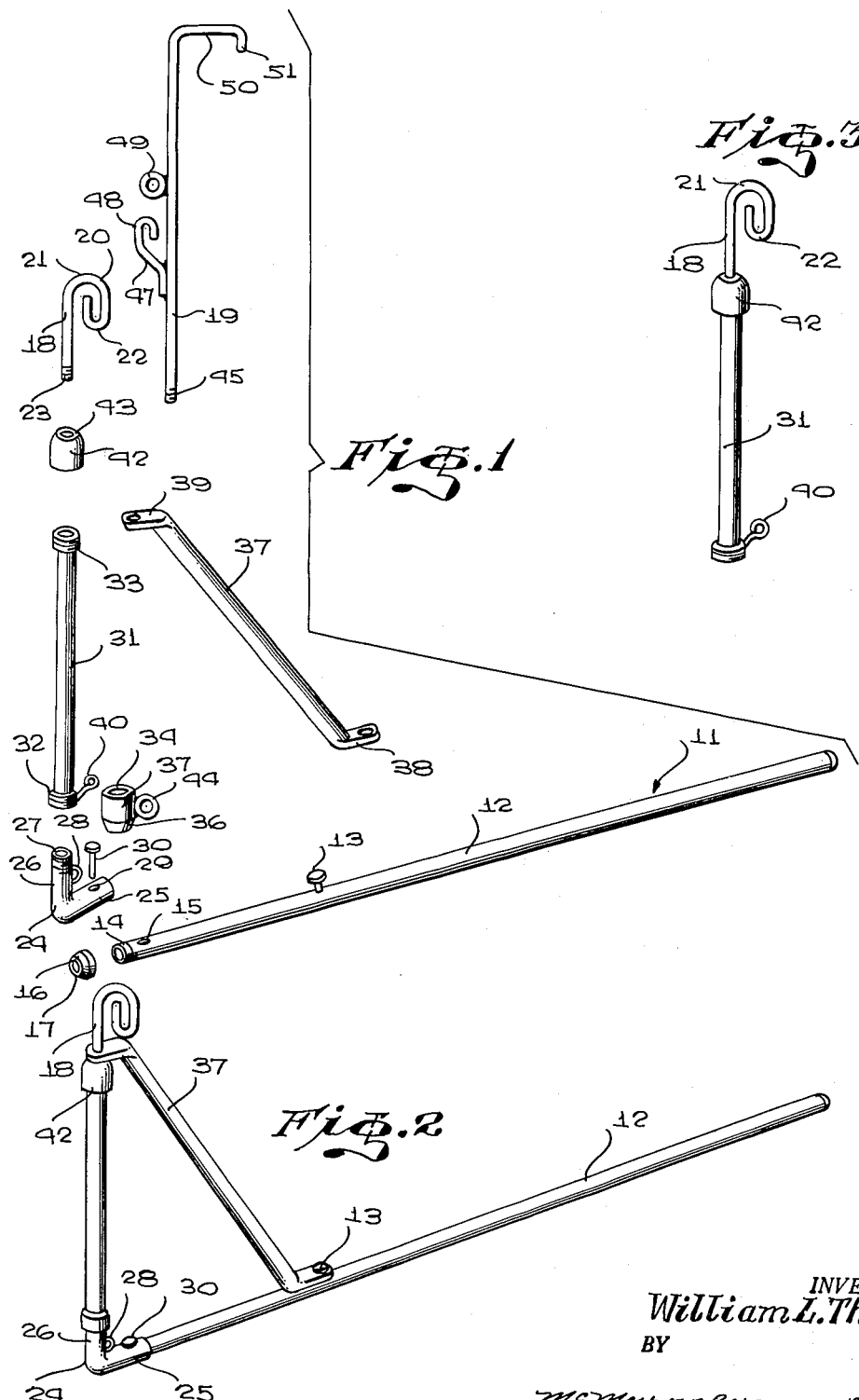
INVENTOR.
William L. Thorpe
BY
McMorrow, Berman & Davidson
ATTORNEYS

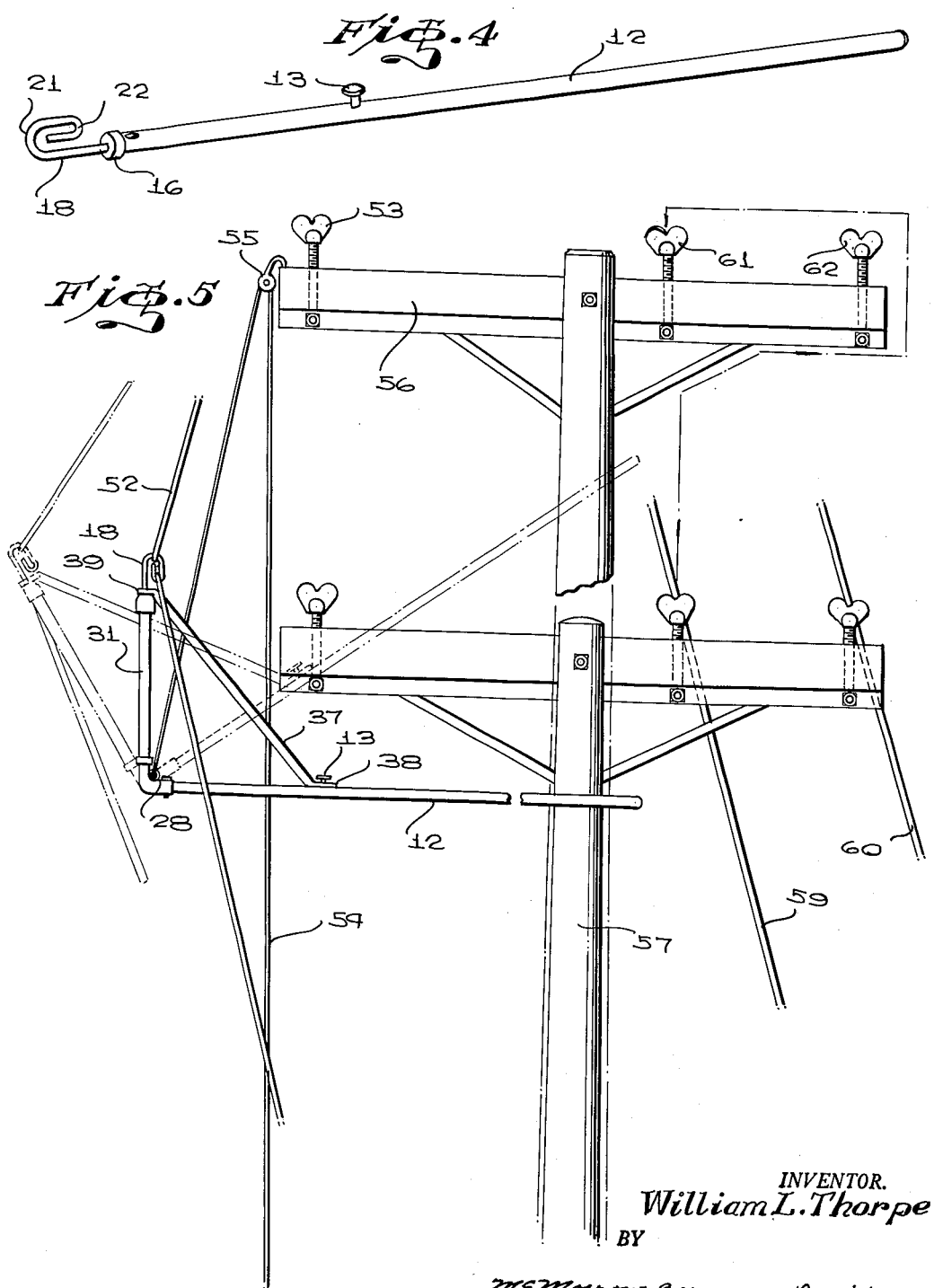

March 27, 1956 W. L. THORPE 2,739,832
LINEMAN'S COMBINATION TOOL
Filed Feb. 20, 1953 3 Sheets-Sheet 3
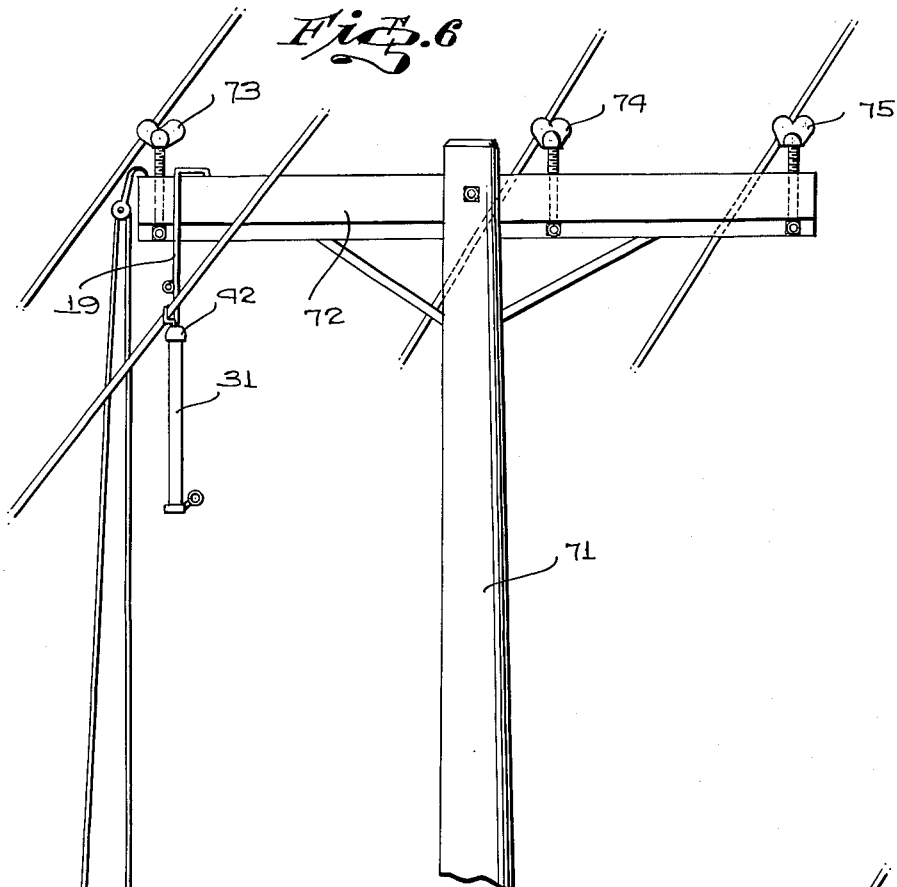
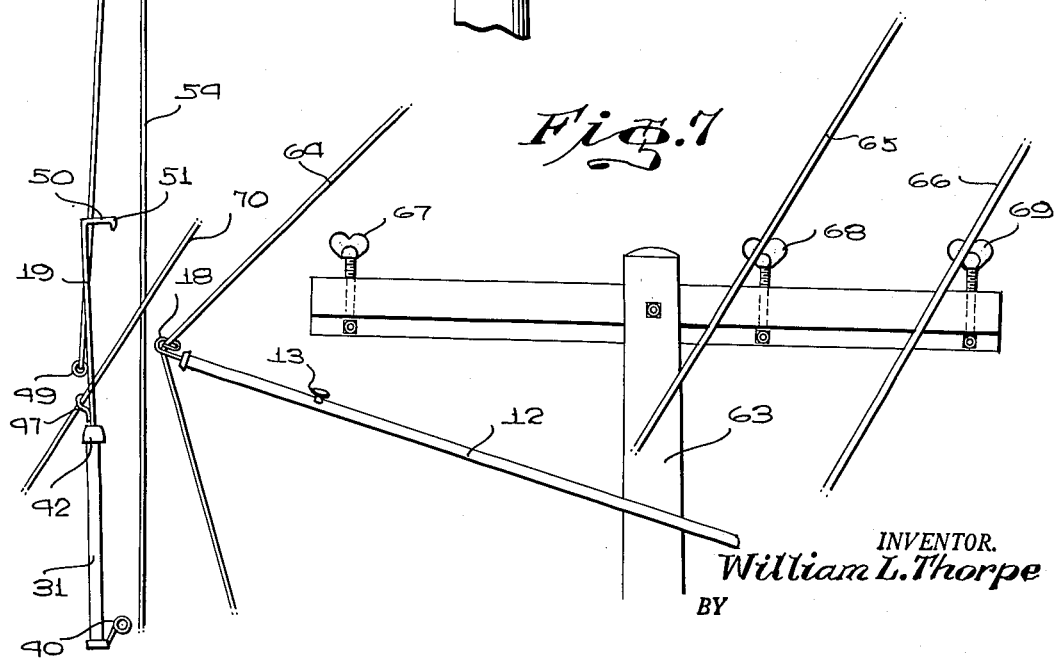
INVENTOR.
William L. Thorpe
BY
McMorrow, Berman & Davidson
ATTORNEYS

United States Patent Office 2,739,832
Patented Mar. 27, 1956

2,739,832
LINEMAN'S COMBINATION TOOL
William L. Thorpe, Garden Grove, Calif.

Application February 20, 1953, Serial No. 338,017

4 Claims. (Cl. 294—19)

This invention relates to lineman's tools, and more particularly to an improved combination tool for use in installing high voltage wire.

The main object of the invention is to provide a novel and improved lineman's implement which is arranged so that it may be assembled to provide several different types of tools for use in installing high voltage electric wire, the implement involving simple components, being easy to assemble, and providing a means of greatly simplifying the task of installing high voltage electric cable on the cross arms of a supporting pole.

A further object of the invention is to provide an improved combination lineman's tool which involves inexpensive components, which is sturdy in construction, which may be easily taken apart and reassembled, whenever desired, and which greatly reduces the amount of time and human labor required in installing cables or wires on elevated structures, such as on the cross arms of supporting poles.

Further objects and advantages of the invention will become apparent from the following description and claims, and from the accompanying drawings, wherein:

Figure 1 is a view showing the several components of a combination lineman's implement constructed in accordance with the present invention, the components being shown in separated positions.

Figure 2 is a perspective view of one type of wire-handling tool constructed from the components of the implement of Figure 1.

Figure 3 is a perspective view of another form of tool which may be constructed from the components shown in Figure 1.

Figure 4 is a perspective view of still another implement which may be constructed from the components shown in Figure 1.

Figure 5 is a side elevational view of a supporting pole and cross arms, intended to support high voltage electric wire, and illustrating the method of installation of the wire employing the implement of Figure 2.

Figure 6 is a view of a supporting pole and cross arm for supporting high voltage electric wire, illustrating the installation of the wire by the use of another implement which may be assembled from the components illustrated in Figure 1.

Figure 7 is a fragmentary side elevational view, similar to Figure 6 but showing the method in which a high voltage electric wire may be handled in mounting the wire on its supporting cross arm, by the use of the implement illustrated in Figure 4.

Referring to the drawings, and more particularly to Figure 1, the combination implement is designated generally at 11 and comprises the several components illustrated, namely, an elongated rigid, tubular rod member 12, intended for use as a handle, said rod member being provided with the headed screw 13 threadedly engaged in the intermediate portion of the rod member, as shown, the end of the rod member being externally threaded at 14 and being provided with the tapped opening 15 adjacent the threaded end 14. Designated at 16 is an annular cap member formed with internal threads adapted to threadedly engage on the external threads 14 at the end of rod member 12, at times, the nut member 16 being formed with the internal threads 17 to receive the threaded end of either a hook member 18 or the elongated rod member 19, as will be presently explained.

The hook member 18, shown in Figure 1, includes the generally spiral shaped hooked portion 20, said hooked portion having the relatively large outer bight element 21 and the relatively small inner bight element 22 opposing the outer bight element 21. The end of the hook member 18 is externally threaded, as shown at 23. The cap member 16 may be threadedly engaged on the threads 14 on the end of rod member 12 and the threaded end 23 of the hook member 18 may be threadedly engaged in the internal threads 17 of the cap member 16, to provide the implement shown in Figure 4.

Designated at 24 is an elbow member having an internally threaded arm 25 adapted to threadedly engage the threads 14 on the end of the rod 12, said elbow having the second arm 26 at right angles to arm 25, said second arm being provided with the external threads 27. The elbow member 24 is provided with the eye member 28 rigidly secured to and projecting from the arm 26. The arm 25 is apertured at 29 to receive a locking screw 30, said screw being threadedly engageable in the tapped opening 15 of the rod member 12 when the elbow 24 is attached to the end of the rod member. Designated at 31 is an elongated tubular arm having the internally threaded enlarged end portion 32 adapted to threadedly engage the externally threaded end 27 of the arm 26. The end of arm 31 is externally threaded, as shown at 33, and is adapted to threadedly engage in an internally threaded portion 34 of a sleeve member 35. The opposite end of the sleeve member 35 has an internally threaded portion 36 adapted to threadedly receive the externally threaded end 23 of the hook member 18. Designated at 37 is a diagonal brace member having the respective apertured lugs 38 and 39 at its opposite ends, the lug 38 being detachably secured to the handle rod 12 by means of the headed screw 13, as shown in Figure 2, and the apertured lug 39 receiving the shank of the hook member 18, as further shown in Figure 2. The implement of Figure 2 may thus be assembled employing the elements 12, 24, 31, 37 and 18 in the manner above described.

The arm 31 is provided at its enlarged end portion 32 with the outwardly projecting eye member 40 for securement to a lifting cable when desired.

The implement shown in Figure 3 may be assembled by merely engaging the threaded end 33 of arm 31 with the internal threads of an annular cap member 42, said annular cap member having internal threads at 43 adapted to threadedly receive the external threads 23 of the hook member 18.

The sleeve member 35, previously described, is generally similar to the cap member 42, except that the sleeve member 35 is provided with an outwardly projecting eye element 44, and at times, the member 42 may be employed in place of the member 35, if so desired.

The final element of the implement comprises the elongated rod member 19, said rod member having the externally threaded end portion 45 which is adapted to threadedly engage in the internally threaded end portion 43 of the cap member 42, as illustrated in Figure 6 in place of the hook member 18, shown in the implement of Figure 3. Rigidly secured on the intermediate portion of the rod member 19 is the hook element 47, said hook element having its shank 48 arranged parallel with the rod 19, as illustrated, an eye member 49 being secured to the intermediate portion of the rod member 19 a short distance from the hook element 47. The end of the rod member 19 is bent at right angles to the main portion thereof, as shown at 50, and is provided with a depending end lug 51.

Referring now to Figure 5, the implement of Figure 2 may be employed to engage a high voltage wire 52 and to elevate said wire onto its insulator 53. Designated at 54 is a cable which extends over a block or pulley 55 attached to the end of the cross arm 56, the end of cable 54 being secured to the eye element 28 of the elbow 24. A workman on the ground pulls on the cable 54 to elevate the implement to the dotted view position thereof shown in Figure 5, the wire 52 being engaged in the hook element 18. A lineman on the supporting pole 57 manipulates the handle rod 12 and rotates the implement to the full line position thereof shown in Figure 5, from which position the lineman on the pole may elevate the wire onto the insulator 53. The remaining wires, such as the wires shown at 59 and 60 are previously placed in their respective insulators 61 and 62 by a similar procedure. The implement of Figure 2 may be employed for placing all of the wires 60, 59 and 54 onto their respective insulators 62, 61 and 53 in sequence by a procedure similar to that above described.

The implement of Figure 4 may be employed in the manner illustrated in Figure 7 by a lineman on the supporting pole 63 to manipulate and position respective wires, such as the high voltage wires 64, 65 and 66 to place them in their respective insulators 67, 68 annd 69.

The implement of Figure 2 and the implement of Figure 4 may be employed interchangeably for certain purposes, but the implement of Figure 2 has specific advantages when employed in the manner illustrated in Figure 5, as over the implement of Figure 4, in that the arm 31 extending at right angles from the handle rod 12 enables the lineman to lift the wire over the cross arm with much greater facility than the implement of Figure 4.

In using either the implement of Figure 2 or the implement of Figure 4, it will be readily apparent that after the wire has been properly positioned, the implement may be disengaged from the wire by gently moving the handle rod 12 to first disengage the wire from the inner bight element 22 of hook 18 and afterwards moving the handle rod in the reverse direction to disengage the rod from the outer bight portion 21.

The implement shown in Figure 3 may be employed independently in a manner similar to that of the implement shown in Figure 4, or may form a part of the implement of Figure 2, since the arm 31 may be attached so as to extend at right angles to the handle rod 12, as above described.

Referring now to Figure 6, the elongated rod member 19 may be connected to the arm 31, as above described, and as illustrated in Figure 6, to provide a still further type of tool. In using the tool of Figure 6, the end of the cable 54 is secured to the eye element 49 and the wire, shown at 70, is engaged in the hook element 47. The workman on the ground may then pull on the cable 54 to elevate the implement and the wire 70 to a position adjacent the upper end of the pole, shown at 71, whereby the arm 50 on the end of the rod 19 may be lifted over the cross arm 72, allowing the wire to be supported by the implement with said arm 50 engaged on the cross arm in the manner illustrated at the upper portion of Figure 6. As will be further apparent from Figure 6, several implements may be employed in the operation, each implement being employed with one of the wires so that the wires may be separately mounted on their respective insulators in more rapid succession than if a single implement were employed. The respective wires are lifted onto their insulators, such as the insulators 73, 74 and 75 by a lineman on the upper portion of the pole 71, after the respective implements have been engaged on the cross arms in the manner previously described, the lineman employing the arm 31 of each implement as a handle for elevating the associated wire onto its insulator.

While certain specific embodiments of a combination lineman's tool have been disclosed in the foregoing description, it will be understood that various modifications within the spirit of the invention may occur to those skilled in the art. Therefore, it is intended that no limitations be placed on the invnvention except as defined by the scope of the appended claims.

What is claimed is:

1. A lineman's tool of the character described comprising an elongated rigid, rod-like handle member, a rigid, laterally projecting member detachably secured to the end of said handle member and projecting substantially at right angles to said handle member, and a wire-engaging hook element rigidly secured to one of said members, said hook element being substantially spiral-shaped and comprising a relatively large outer bight element and a relatively small inner bight element contained in and opposing said outer bight element, said outer and inner bight elements being in the same plane.

2. A lineman's tool of the character described comprising an elongated rigid, rod-like handle member, a rigid, laterally projecting member detachably secured to the end of said handle member and projecting substantially at right angles to said handle member, a wire-engaging hook element rigidly secured to one of said members, said hook element being substantially spiral-shaped and comprising a relatively large outer bight element and a relatively small inner bight element contained in and opposing said outer bight element, said outer and inner bight elements being in the same plane, and an eye member secured to one of the members and projecting outwardly therefrom.

3. A lineman's tool of the character described comprising an elongated rigid, rod-like handle member, a rigid, laterally projecting member detachably secured to the end of said handle member and projecting substantially at right angles to said handle member, a wire-engaging hook element rigidly secured to the end of said laterally projecting member, said hook element being substantially spiral-shaped and comprising a relatively large outer bight element and a relatively small inner bight element contained in and opposing said outer bight element, said outer and inner bight elements being in the same plane, and an eye member secured to one of the members and projecting outwardly therefrom.

4. A lineman's tool of the character described comprising an elongated rigid, rod-like handle member, an elbow detachably secured on the end of said handle member, an eye member secured to and projecting from said elbow, a rigid arm of substantial length detachably secured to said elbow and projecting at right angles to said handle member, a diagonal strut member detachably connected to the outer end of said arm and to the intermediate portion of said handle member, and a wire-engaging hook element detachably secured to the outer end of said arm, said hook element being substantially spiral-shaped and comprising a relatively large outer bight element and a relatively small inner bight element contained in and opposing said outer bight element and being continuous therewith, said bight elements being located in the same plane.

References Cited in the file of this patent

UNITED STATES PATENTS

| | | |
|---|---|---|
| 1,045,680 | Cronin | Nov. 26, 1912 |
| 1,259,372 | Davey | Mar. 12, 1918 |
| 1,793,733 | Bodendieck | Feb. 24, 1931 |